United States Patent [19]

Ackerman, Jr. et al.

[11] 3,771,416

[45] Nov. 13, 1973

[54] REMOVABLE WEAPONS RAIL

[75] Inventors: William H. Ackerman, Jr., East Islip; Emery Fischer; Gerald L. Caruso, both of Levittown, all of N.Y.

[73] Assignee: The United States of America as represented by the Secretary of the Navy, Washington, D.C.

[22] Filed: Sept. 22, 1971

[21] Appl. No.: 182,611

[52] U.S. Cl............ 89/1.5 R, 89/1.819, 244/137 R
[51] Int. Cl................................................ B64d 1/04
[58] Field of Search..................... 89/1.5 AU, 1.819; 214/1 D; 244/137

[56] References Cited
UNITED STATES PATENTS

| | | | |
|---|---|---|---|
| 2,604,353 | 7/1952 | Pierson et al. | 89/1.5 G X |
| 3,468,501 | 9/1969 | Baum | 89/1.5 R X |
| 2,621,565 | 12/1952 | Laddon et al. | 89/1.5 R |
| 2,634,656 | 4/1953 | Woollens et al. | 89/1.5 R |
| 2,889,746 | 6/1959 | Glassman et al. | 89/1.5 F |
| 3,122,056 | 2/1964 | Fitch et al. | 89/1.5 R |
| 3,242,808 | 3/1966 | Nelson et al. | 89/1.5 R |

*Primary Examiner*—Samuel W. Engle
*Attorney*—R. S. Sciascia et al.

[57] ABSTRACT

A removable weapons rail which is adaptable for bomb racks or missile launchers. Standard couplings mount the rail to an aircraft. A hoist system for moving the loaded or unloaded rail to or from mounting position is internally contained in the rail.

6 Claims, 10 Drawing Figures

PATENTED NOV 13 1973
3,771,416
SHEET 1 OF 2
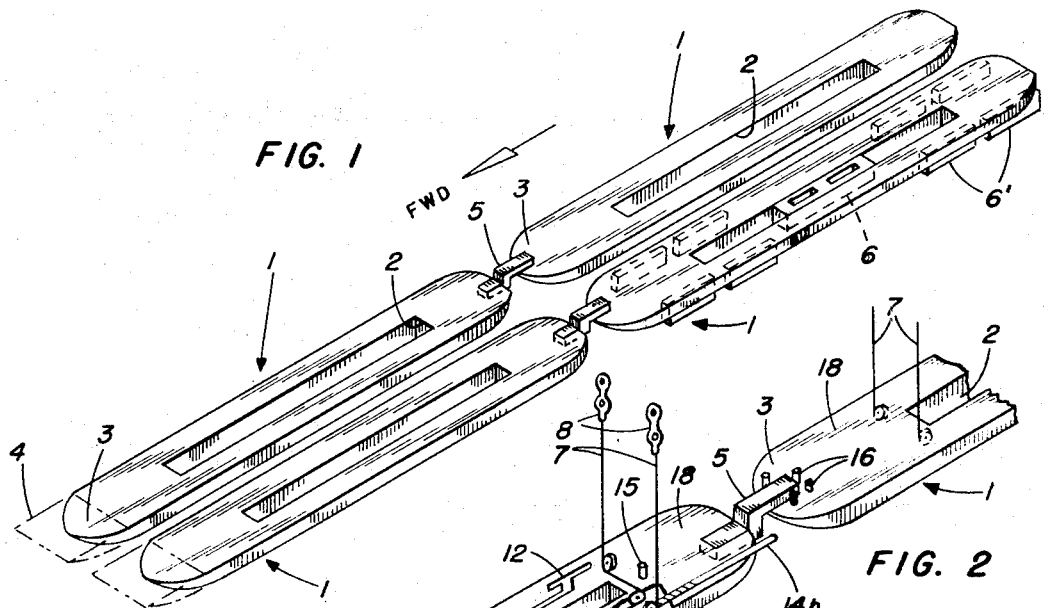
FIG. 1
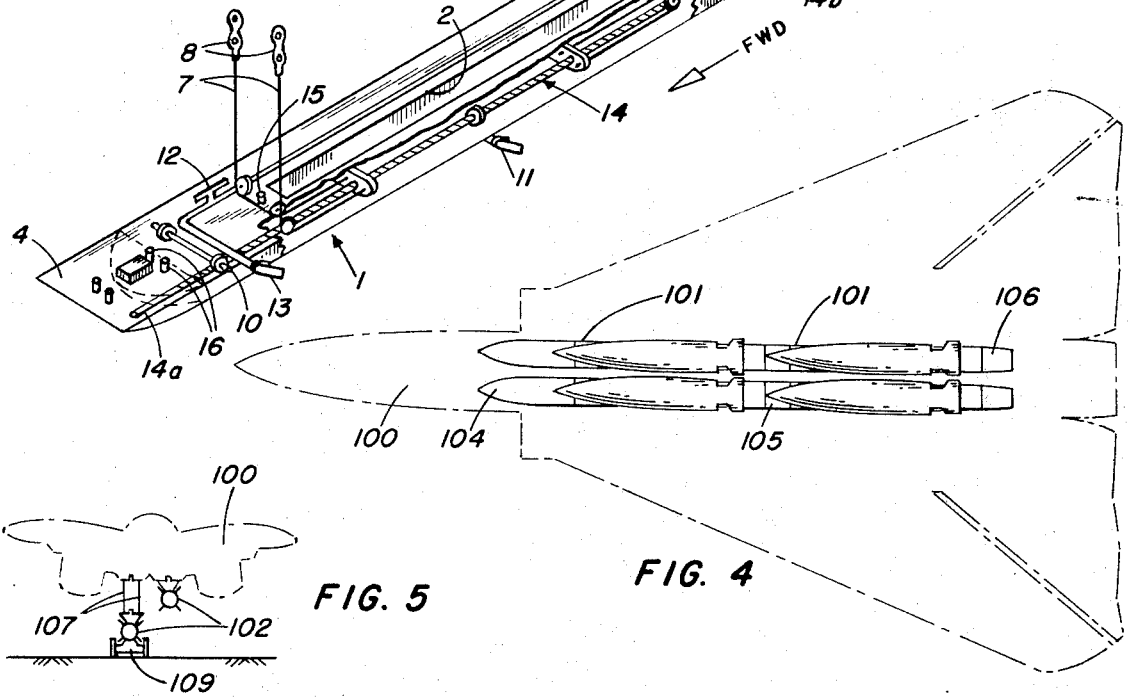
FIG. 2
FIG. 4
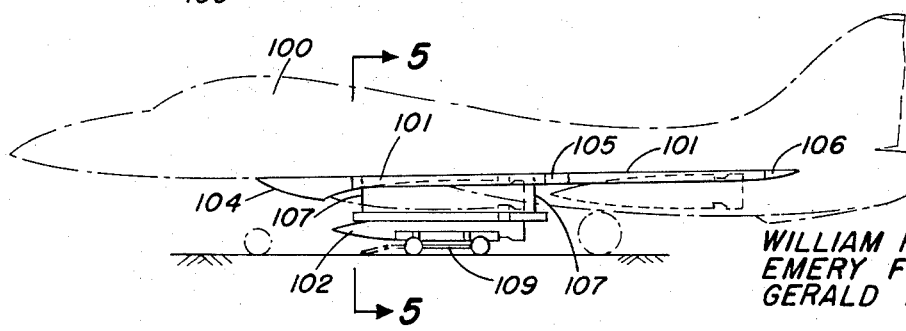
FIG. 5
FIG. 3
INVENTORS
WILLIAM H. ACKERMAN, JR.
EMERY FISCHER
GERALD L. CARUSO 3,771,416

REMOVABLE WEAPONS RAIL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the Invention

The present invention relates generally to a weapons rail system, and more particularly to a weapons rail system adaptable for loading and unloading weapons, and maintaining the weapons in a delivery position on an aircraft.

Description of the Prior Art

In the field of aircraft weapons delivery systems, one of the problems is the loading and unloading of weapons to and from aircraft delivery position. U. S. Pat. No. 2,940,769 shows an elevating dolly to mount equipment and position it on an aircraft by the use of hydraulic jacks. U. S. Pat. No. 2,613,822 discloses a load carrying truck device which is also hydraulically lifted with the weapon mounted thereon to position it on an aircraft. U. S. Pat. No. 2,822,931 shows a separate hoisting assembly to load weapons onto aircraft. These patents are a representative sample of the support equipment necessary for the conventional loading and unloading of the aircraft weapons.

The use of a common launcher for different kinds of missiles such as Phoenix and Sparrow has been found undesirable based on the added weight and complexity required for such a launcher and on missile characteristics which suggest different positions on an aircraft for the different kinds of missiles. Support arrangements for the common launchers require specialized equipment for each missile system which increases the aircraft internal volume, increases the drag and degrades the aircraft performance.

SUMMARY OF THE INVENTION

The removable weapon rail concept of the present invention provides a means to carry and ultimately deliver weapons and stores while eliminating weight, cross-sectional area, and fuselage volume not specifically required for the primary mission. Additionally it provides a relatively low drag installation for the alternate stores and clean aircraft after weapon delivery without loss of the weapon suspension system. A built-in hoist system eliminates the need for bulky ground support equipment.

OBJECTS OF THE INVENTION

An object of the present invention is to provide an universal weapons mounting system adaptable for a variety of aircraft weapons.

Another object is to provide a quick, reliable, and economical weapons mounting system.

A further object of the invention is to provide a low drag installation which eliminates the need to jettison the store suspension equipment after weapons delivery.

Still another object is to eliminate the requirement for "parent" ejection racks in the basic aircraft structure by provision of the weapon rail.

A still further object is to provide improved structural efficiency of aircraft by having a minimum weight and minimum volume, by placing equipment not needed for the basic aircraft or primary mission but related to the alternate stores in the weapon rail rather than in the basic aircraft.

Yet another object of the invention is to eliminate the need for ground support hoist and lift equipment by providing a self-contained hoist system in the weapon rail.

A still further object of the invention is to provide a system whereby quick reconfiguration from the primary mission of the basic aircraft to alternate missions and vice versa is possible.

Another object is to provide equipment which permits development of new weapons and suspension devices without requiring a redesign of the aircraft or possible interruption of national security.

A further object of the invention is to reduce aircraft weapons handling and turnaround time.

Another object of the invention is to enable preloading of weapons on the weapons rail to reduce turnaround time and make possible a rapid conversion from one armament configuration to another, including the capability to convert readily to future weapon and suspension system.

Another object of the invention is to provide a removable nose fairing/pallet for use with larger or more complex missiles, e.g. a Phoenix missile, and being removable or replaceable when these components are not required for other missions.

Other objects, advantages, and novel features of the present invention will become apparent from the following detailed description of the invention when considered in conjunction with the accompanying drawings.

BRIEF DESCRIPTION OF THE DRAWINGS

FIG. 1 is a simplified perspective view of the weapons rail segments.

FIG. 2 is a perspective view of the weapon rail segments with portions thereof cutaway to show the hoist mechanism.

FIG. 3 shows an alternate form of the weapons rail mounted on an aircraft.

FIG. 4 is a bottom view of FIG. 3.

FIG. 5 is a cross-sectional view of FIG. 3 along line 5—5.

FIG. 1, which illustrates a preferred embodiment of the invention, shows weapon rail segments 1. Opening 2 accomodates a missile launcher such as a Phoenix launcher or a bomb rack. Nose fairing 3 may be covered by pallets/nose fairings 4 when larger missiles, such as the Phoenix missile, are to be used. Umbilical bridges 5 connect the forward and aft rails 1. Bomb racks 6 and 6' are shown schematically.

FIG. 2 shows the preferred embodiment in more detail. Hoist cables 7 are connected to the aircraft by links 8. Integral hoisting actuator 14 can be operated from either end 14a or 14b. The hoisting actuator 14 operates as a non-reversing worm so that actuation of the hoisting mechanism may be interrupted temporarily without the weapons rail slipping out of position. The actuator to be used at ends 14a or 14b is ideally a manually held pneumatic torquer which connects as a non-circular male to female connection with ends 14a or 14b. Although not shown in FIG. 2, male ends 14a and 14b are square and cooperate with a square female portion of the torquer. Manual actuation may be used as a backup method of action, for example, by using a crank type mechanism at ends 14a or 14b. Uplatch shear pins 12 are schematically shown and are gang-mechanized to operate from a common actuator. Shear pin actuator 13 serves as an uplock mechanism and flag for shear pins 12. Shear connectors 15 serve to aid in positioning the weapons rail and to stabilize it when connected. Other types of connectors may be used to affix the rail to the aircraft. The safe/arm drive 10 operates a ganged-mechanism to safe or arm the bomb racks or missile launcher. The safe/arm flag 11 indicates the condition of the safe/arm mechanism. Rail electricity and coolant umbilicals 16 are bridged from one rail to another by semi-immersed forward to aft rail umbilical bridges 5.

FIG. 3 shows an alternate form of the invention attached to aircraft 100. Equipment pallet/nose fairing 104 and tail fairing 106 contain a hoisting mechanism not shown. Cables 107, running from the hoist system, are attached to rail 101 for raising or lowering the weapons rail with or without missile 102 attached. Cart 109 is utilized to position the weapon rail in a loading or unloading position below the aircraft 100. Center fairing 105 aerodynamically connects rail segments 101 and provides a conduit for connections therebetween.

FIG. 6 shows a simplified form of the invention illustrated in FIGS. 3 – 5. Equipment pallet/nose fairing 104, for larger missiles such as the Phoenix missile, is replaceable by nose fairing 103 for use with smaller weapons. Nose fairings 103 and 104, and tail fairing 106 may have access doors, not shown. Weapons rail segments 101 are connected by center fairing 105.

FIG. 7 shows the weapons rail 201 connected to aircraft 200. Normal nose and tail fairings 203 and 205, respectively, have been replaced by nose and tail fairings 204 and 206, respectively, to accommodate high drag bombs for a low installation. Bomb racks, not shown, connect the rail 201 to bombs 202. Two rows of bombs 202 are disposed along aircraft 200 and connected by weapon rail segments 201.

FIG. 9 shows another type of bomb arrangement which can be used in the weapon rail system of the present invention. Bombs 302 are connected by schematically shown bomb racks 304 to rails 301. Since bombs 302 are aerodynamically designed and require little or no support equipment, nose fairing 303 is of the smaller type. Center fairing 305 connects weapons rail segments 301. Tail fairing 306 in this embodiment is substantially of the same configuration as nose fairing 303. FIG. 10 is a cross-section of FIG. 9 and shows aircraft 300 with three rows of bombs 302 disposed thereon and connected by weapon rail 301. Smaller bombs may be accomodated in four rows in this arrangement.

Figure 6:
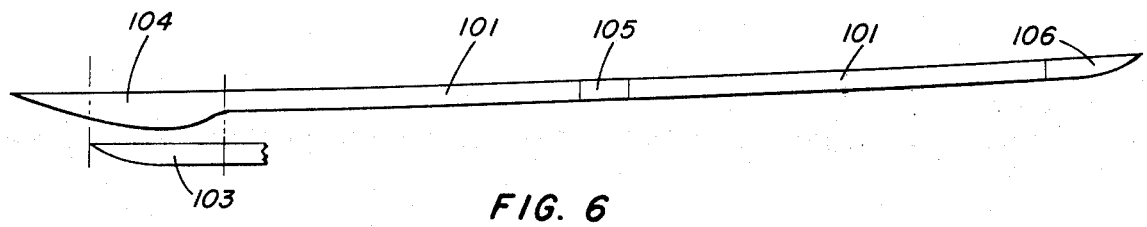
FIG. 6 shows simplified side view of the weapons rail of FIGS. 3 – 5.

In the operation of the embodiment of FIGS. 1 and 2, bombs or missiles are attached to the weapons rail by bomb racks or missile launchers not shown in FIGS. 1 and 2. The weapons rail 1 is positioned under an aircraft with or without bomb or missiles attached thereto. Links 8 are attached to the underside of the aircraft and integral hoisting actuator 14 is rotated at end 14a or 14b until surface 18 is flush with the underside of the aircraft. An uplock mechanism and flag 13 is then rotated so that uplatch shear pins 12 connect and hold the weapons rail firmly and positively to the aircraft. Whether or not larger nose fairing 4 is used will depend on the weapons system being used. Rail electrical and cooling umbilicals are self aligning and self mating and are automatically connected during loading if required for the weapons system. To unload the weapons rail system a reverse process is used.

In the embodiment of FIGS. 3 – 6 nose and tail fairings 104 and 106, respectively, are connected to the aircraft. Cart 109 is used to position the weapons rail 101 under the aircraft with or without bomb or missile 102 attached. Hoist cables 107, which are part of the hoist mechanism built into nose and tail fairings 104 and 106, respectively, are connected to the weapons rail 101. The hoist mechanism may then be actuated to raise or lower the weapons rail. Any suitable locking mechanism may connect the rail, and nose and tail fairing to the aircraft.

Figure 7:
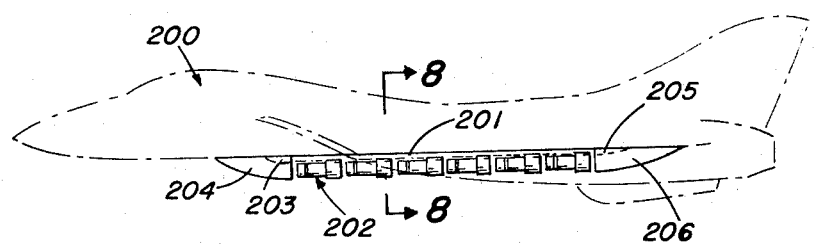
FIG. 7 shows another arrangement of the weapons rail.
Figure 8:
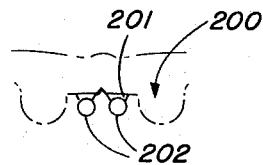
FIG. 8 is a simplified cross-sectional view of FIG. 7 along line 8—8.
Figure 9:
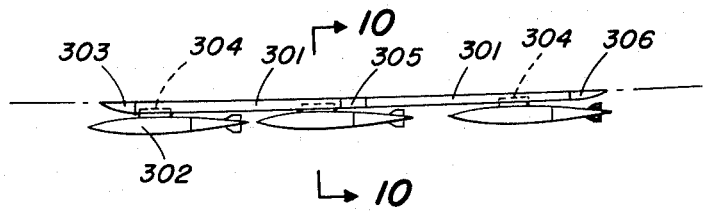
FIG. 9 shows an alternate bomb arrangement on the weapon rail.
Figure 10:
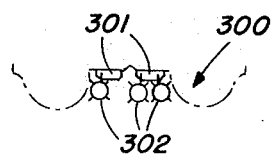
FIG. 10 is a simplified cross-sectional view of FIG. 9 along line 10—10.

The design configuration of the nose and tail fairings are substantially independent of whether the hoist is built into the rail segment as in the embodiment of FIGS. 1 and 2, or whether the hoist system is in the nose and tail fairings as in the embodiment of FIGS. 3 – 6. The embodiments of FIGS. 7 – 10 may, for example, use either of the previously mentioned hoist systems.

Obviously many modifications and variations of the present invention are possible in light of the above teachings. It is therefore to be understood that, within the scope of the appended claims, the invention may be practiced otherwise than as specifically described.

What is claimed is:

1. A removable weapons rail system for aircraft comprising:
   a weapons rail segment having means for direct connection to an aircraft;
   means for attaching at least one bomb or missile rack to said rail segment;
   a hoist means comprising:
   a threaded rod rotatably mounted in said rail segment and having an actuator end thereon;
   a first plate means threadably connected to said threaded rod and movable along said rod by rotation of said rod;
   a first pulley fastened to said rail segment;
   first cable means having an end attached to said plate means;
   said cable means extending through said pulley and being adapted to be connected to an aircraft at the other end of said cable means.

2. The system of claim 1 including a second plate means threadably connected to said threaded rod and movable along said rod by rotation of said rod;
   a second pulley fastened to said rail segment;
   second cable means having an end thereof attached to said second plate means;
   said second cable means extending through said second pulley and being adapted to be connected to an aircraft at the other end of said second cable means.

3. The system of claim 2 including third, fourth, fifth, and sixth pulleys connected to said rail segment;
third cable means having an end thereof attached to said first plate means;
said third cable means extending through said third and fourth pulleys and being adapted to be connected to an aircraft at the other end thereof;
fourth cable means having an end thereof attached to said second plate means;
said fourth cable means extending through said fifth and sixth pulleys and being adapted to be connected to an aircraft at the other end thereof.

4. The system of claim 1 wherein said rail segment has a first nose fairing at one end thereof; and
a second nose fairing in abutting relationship under said first nose fairing and covering said first nose fairing.

5. The device of claim 4 wherein said second nose fairing contains support equipment for at least one missile.

6. The system of claim 1 including shear connector pins on said weapons rail segment for reception into complementary openings in the aircraft to assure positive alignment of said rail segment with respect to said airplane.

* * * * *